United States Patent
Kubota et al.

(10) Patent No.: US 11,034,854 B2
(45) Date of Patent: Jun. 15, 2021

(54) LIGHT-SHIELDING PAINT, LIGHT-SHIELDING PAINT SET, LIGHT-SHIELDING FILM, OPTICAL ELEMENT, METHOD FOR PRODUCING LIGHT-SHIELDING FILM, AND METHOD FOR PRODUCING OPTICAL ELEMENT

(71) Applicant: CANON KABUSHIKI KAISHA, Tokyo (JP)

(72) Inventors: Reiko Kubota, Yokohama (JP); Yoji Teramoto, Yokohama (JP); Shuhei Yamamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/265,899

(22) Filed: Feb. 1, 2019

(65) Prior Publication Data
US 2019/0169462 A1    Jun. 6, 2019

Related U.S. Application Data

(62) Division of application No. 14/818,159, filed on Aug. 4, 2015, now Pat. No. 10,240,063.

(30) Foreign Application Priority Data

Aug. 8, 2014    (JP) .................................. 2014-163211

(51) Int. Cl.
*C09D 163/00* (2006.01)
*G02B 5/00* (2006.01)
(Continued)

(52) U.S. Cl.
CPC ............ *C09D 163/00* (2013.01); *C08G 59/50* (2013.01); *C08G 59/686* (2013.01); *G02B 5/003* (2013.01);
(Continued)

(58) Field of Classification Search
CPC ...... C08L 63/00–10; C09D 163/00–10; C09D 5/006; C08G 59/50; C08G 59/686; G02B 5/03; C08K 2003/2241
See application file for complete search history.

(56) References Cited

U.S. PATENT DOCUMENTS

2005/0208296 A1*  9/2005  Saiki ................. H01L 21/67132
                                                                428/343
2009/0226729 A1*  9/2009  Niimoto ............. C08G 59/4007
                                                                428/416
(Continued)

FOREIGN PATENT DOCUMENTS

WO    WO-2013021575 A2 *  2/2013   .............. G02B 1/04

OTHER PUBLICATIONS

Refractiveindex.info, Refractive index database https://refractiveindex.info/?shelf=main&book=TiO2&page=Devore-o (retrieved Apr. 13, 2017) and Sakai Chemical Industry Co., Ltd., Titanium Dioxide Product Details, http://www.sakai-chem.co.jp/en/products/product_01_01.html (retrieved Apr. 20, 2017).*

*Primary Examiner* — Kregg T Brooks
(74) *Attorney, Agent, or Firm* — Canon U.S.A., Inc., IP Division

(57) ABSTRACT

A light-shielding paint includes an epoxy group-containing compound, an inorganic fine particle, a coloring agent, and an amine curing agent. The ratio (A'/A) of the mass (A') of the amine curing agent to the active hydrogen equivalent (A) of the amine curing agent and the ratio (E'/E) of the mass (E') of the epoxy group-containing compound to the epoxy equivalent (E) of the epoxy group-containing compound satisfy $0.1 \leq [(A'/A)/(E'/E)] \leq 0.45$.

23 Claims, 3 Drawing Sheets

(51) Int. Cl.
*C08G 59/50* (2006.01)
*C08G 59/68* (2006.01)
*C08K 3/22* (2006.01)

(52) U.S. Cl.
CPC ........ *C08K 3/22* (2013.01); *C08K 2003/2241* (2013.01)

(56) References Cited

U.S. PATENT DOCUMENTS

2009/0274844 A1* 11/2009 Scheibel ................ C09D 5/024
 427/386
2011/0170196 A1* 7/2011 Tanaka ................ C09D 163/00
 359/614

* cited by examiner

LIGHT-SHIELDING PAINT, LIGHT-SHIELDING PAINT SET, LIGHT-SHIELDING FILM, OPTICAL ELEMENT, METHOD FOR PRODUCING LIGHT-SHIELDING FILM, AND METHOD FOR PRODUCING OPTICAL ELEMENT

CROSS-REFERENCE TO RELATED APPLICATIONS

This application is a divisional of U.S. application Ser. No. 14/818,159, filed Aug. 4, 2015, which claims the benefit of Japanese Patent Application No. 2014-163211, filed Aug. 8, 2014, each of which is hereby incorporated by reference herein in its entirety.

BACKGROUND OF THE INVENTION

Field of the Invention

The present invention relates to a light-shielding paint used for optical devices such as cameras, binoculars, and microscopes, a light-shielding paint set, a light-shielding film and a method for producing the light-shielding film, and an optical element and a method for producing the optical element.

Description of the Related Art

Light-shielding films used for optical elements or the like are mainly films disposed on the surface of glass. Such optical elements may be lenses, prisms, or other optical glasses. Hereafter, light-shielding films will be described using a lens as an example.

As illustrated in FIG. 6, a light-shielding film 1 of an optical element is disposed in a desired peripheral portion of a lens 2. When light strikes only the lens 2 as in the case of incident light 3, the light passes through the lens 2 as transmitted light 4. When incident light 5 enters the lens 2 diagonally, the light strikes the light-shielding film 1. Herein, if the light-shielding film is not disposed (lower side of the lens in FIG. 6), the light that has struck the peripheral surface of the lens 2 undergoes internal reflection. The internally reflected light 6 unrelated to an image is emitted from the lens 2 and causes flare and ghosting, which degrades the image. When the light-shielding film 1 is disposed (upper side of the lens in FIG. 6), the internal reflection caused by the diagonal incident light 5 can be reduced. Thus, the amount of the internally reflected light 6 that adversely affects the image is reduced, and flare and ghosting can be prevented.

The light-shielding film 1 for lenses is disposed at a position at which the light-shielding film 1 is visible when a lens user sees a lens barrel. Therefore, the light-shielding film 1 needs to have high-quality appearance for a long time. Specifically, a light-shielding film having appearance which is not easily changed is required even if being used in a high-temperature and high-humidity environment.

In recent years, there have been many glasses for optical elements such as lanthanum-based glasses, titanium-based glasses, alumina-based glasses, zirconia-based glasses, fluorine-based glasses, niobium-based glasses, tantalum-based glasses, and boron-based glasses, in addition to known silica-based glasses, for the purpose of providing characteristics in terms of refractive index, Abbe number, dispersion, and the like. When a light-shielding film is formed on each of these glasses and left in a high-temperature and high-humidity environment for a long time, white spots are generated at an interface between the glass and the light-shielding film, which may degrade the appearance.

WO2013125544A (hereafter referred to as "Patent Document 1") discloses a light-shielding film formed by curing a light-shielding paint which contains an epoxy resin and an amine curing agent and in which, for example, the equivalent ratio of the active hydrogen equivalent of the amine curing agent and the epoxy equivalent of the epoxy resin is specified. Patent Document 1 discloses a light-shielding film that is less likely to be detached in a high-temperature and high-humidity environment and has resistance to a cleaning liquid, which is achieved by increasing the cross-linking density of the epoxy resin.

However, such an increase in the cross-linking density of the epoxy resin in the light-shielding film in Patent Document 1 has limitation in terms of preventing the detachment of a light-shielding film including the generation of white spots.

SUMMARY OF THE INVENTION

A light-shielding paint according to an embodiment of the present invention includes an epoxy group-containing compound, an inorganic fine particle, a coloring agent, and an amine curing agent, wherein a ratio (A'/A) of a mass (A') of the amine curing agent to an active hydrogen equivalent (A) of the amine curing agent and a ratio (E'/E) of a mass (E') of the epoxy group-containing compound to an epoxy equivalent (E) of the epoxy group-containing compound satisfy formula (1) below.

$$0.1 \leq [(A'/A)/(E'/E)] \leq 0.45 \quad \text{Formula (1)}$$

A light-shielding paint set for an optical element according to an embodiment of the present invention includes two or more units which includes a unit containing an epoxy group-containing compound and a unit containing an amine curing agent, wherein the light-shielding paint set contains an inorganic fine particle and a coloring agent in any of the units, and a ratio (A'/A) of a mass (A') of the amine curing agent to an active hydrogen equivalent (A) of the amine curing agent and a ratio (E'/E) of a mass (E') of the epoxy group-containing compound to an epoxy equivalent (E) of the epoxy group-containing compound satisfy formula (1) below.

$$0.1 \leq ((A'/A)/(E'/E)) \leq 0.45 \quad \text{Formula (1)}$$

A light-shielding film according to an embodiment of the present invention is produced from a light-shielding paint that contains an epoxy group-containing compound, an inorganic fine particle, a coloring agent, and an amine curing agent, wherein a ratio (A'/A) of a mass (A') of the amine curing agent to an active hydrogen equivalent (A) of the amine curing agent and a ratio (E'/E) of a mass (E') of the epoxy group-containing compound to an epoxy equivalent (E) of the epoxy group-containing compound satisfy formula (1) below.

$$0.1 \leq [(A'/A)/(E'/E)] \leq 0.45 \quad \text{Formula (1)}$$

An optical element according to an embodiment of the present invention includes a light-shielding film disposed on a portion of a base made of an optical material, wherein the light-shielding film is produced from a light-shielding paint that contains an epoxy group-containing compound, an inorganic fine particle, a coloring agent, an amine curing agent, and a curing catalyst, and a ratio (A'/A) of a mass (A') of the amine curing agent to an active hydrogen equivalent (A) of the amine curing agent and a ratio (E'/E) of a mass (E') of the epoxy group-containing compound to an epoxy equivalent (E) of the epoxy group-containing compound satisfy formula (1) below.

$$0.1 \leq [(A'/A)/(E'/E)] \leq 0.45 \qquad \text{Formula (1)}$$

A method for producing a light-shielding film according to an embodiment of the present invention includes applying, onto a base, a light-shielding paint containing an epoxy group-containing compound, an inorganic fine particle, a coloring agent, and an amine curing agent and curing the applied light-shielding paint in an atmosphere of 20° C. or more and 200° C. or less, wherein a ratio (A'/A) of a mass (A') of the amine curing agent to an active hydrogen equivalent (A) of the amine curing agent and a ratio (E'/E) of a mass (E') of the epoxy group-containing compound to an epoxy equivalent (E) of the epoxy group-containing compound satisfy formula (1) below.

$$0.1 \leq ((A'/A)/(E'/E)) \leq 0.45 \qquad \text{Formula (1)}$$

A method for producing an optical element according to an embodiment of the present invention, the optical element including a light-shielding film disposed on a peripheral surface of a base made of an optical material, includes applying, onto the peripheral surface of the base, a light-shielding paint containing an epoxy group-containing compound, an inorganic fine particle, a coloring agent, and an amine curing agent and curing the applied light-shielding paint in an atmosphere of 20° C. or more and 200° C. or less, wherein a ratio (A'/A) of a mass (A') of the amine curing agent to an active hydrogen equivalent (A) of the amine curing agent and a ratio (E'/E) of a mass (E') of the epoxy group-containing compound to an epoxy equivalent (E) of the epoxy group-containing compound satisfy formula (1) below.

$$0.1 \leq ((A'/A)/(E'/E)) \leq 0.45 \qquad \text{Formula (1)}$$

Further features of the present invention will become apparent from the following description of exemplary embodiments with reference to the attached drawings.

DESCRIPTION OF THE EMBODIMENTS

In view of the foregoing background art, the present invention provides a light-shielding paint that suppresses, even in a high-temperature and high-humidity environment, the generation of white spots which are generated at an interface between a glass and a light-shielding film and cause appearance defects, a light-shielding film, and an optical element.

Hereafter, embodiments of the present invention will be described.

A light-shielding paint used for an optical element or the like according to an embodiment of the present invention suppresses white spots that cause appearance defects and provides a light-shielding film also having a function of reducing internal reflection.

Figure 1:
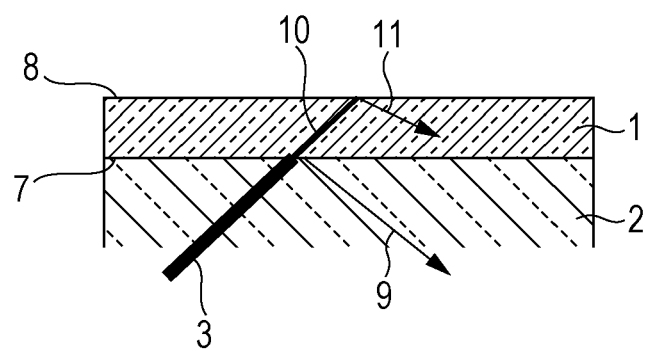
FIG. 1 schematically illustrates the travel of internally reflected light.

First, a structure of the light-shielding film for reducing the internal reflection will be described. Then, a structure of the light-shielding film for suppressing the generation of white spots according to an embodiment of the present invention will be described. Then, a light-shielding paint, a light-shielding paint set, a light-shielding film, an optical element, a method for producing the light-shielding film, and a method for producing the optical element according to an embodiment of the present invention for achieving the foregoing will be described. Structure of light-shielding film for reducing internal reflection The principle of internal reflection of an optical element will be described in detail with reference to FIG. 1. The internal reflection mainly occurs at two interfaces 7 and 8. That is, incident light 3 passes through a lens 2 and first reflected light 9 is generated at the interface 7 between the light-shielding film 1 and the lens 2. Furthermore, transmitted light 10 that has passed through the light-shielding film 1 reaches the interface 8 between the light-shielding film 1 and the air, and second reflected light 11 is generated at the interface 8.

The first reflected light 9 can be reduced by bringing the refractive indices of the light-shielding film 1 and the lens 2 close to each other. The reason why the internal reflection is reduced by bringing the refractive indices close to each other is as follows. As shown in formula (2) below, the reflectance R at the interface between the light-shielding film 1 and the lens 2 is determined by the difference between the refractive index $n_1$ of the light-shielding film 1 and the refractive index $n_0$ of the lens 2 on the incident light 3 side, and the reflectance R decreases as the difference decreases.

$$R = \frac{(n_1 - n_0)^2}{(n_1 + n_0)^2} \qquad \text{Formula (2)}$$

The second reflected light 11 can be reduced by absorbing the transmitted light 10 that has passed through the light-shielding film. In order to efficiently absorb the transmitted light 10 into the film, the light-shielding film 1 can contain a coloring agent or the like so as to have a high degree of blackness.

Figure 2:
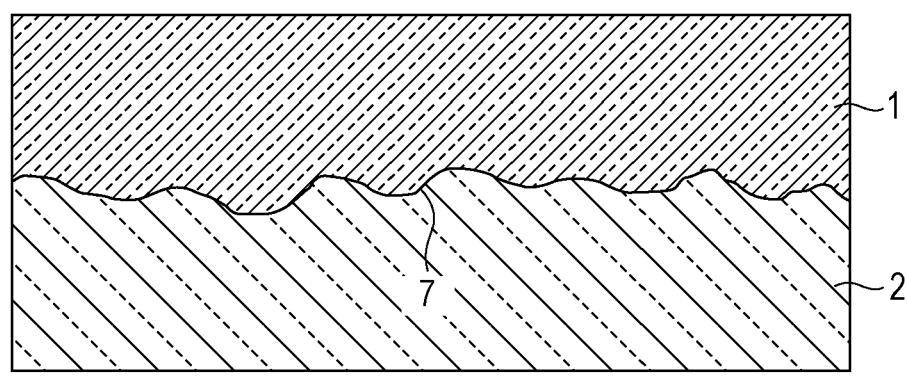
FIG. 2 is a schematic sectional view illustrating an interface between a lens on which a light-shielding film is formed and the light-shielding film.
Figure 3:
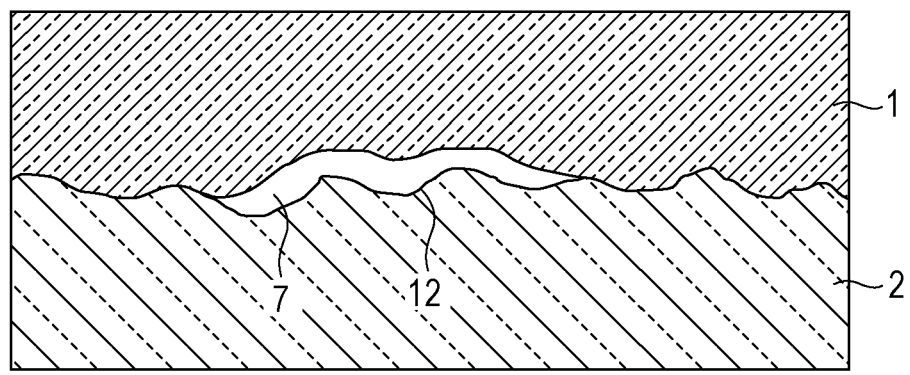
FIG. 3 is a schematic sectional view illustrating an interface between a lens on which a light-shielding film is formed and which is left to stand in a high-temperature and high-humidity environment and the light-shielding film.
Figure 4:
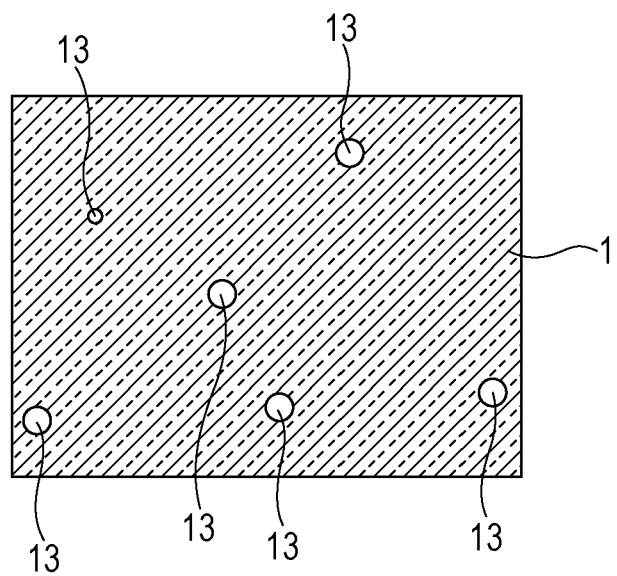
FIG. 4 schematically illustrates the state of white spots after a lens on which a light-shielding film is formed is left to stand in a high-temperature and high-humidity environment.

Structure of Light-Shielding Film for Suppressing Generation of White Spots in High-Temperature and High-Humidity Environment The principle of the generation of white spots generated when the light-shielding film is left to stand in a high-temperature and high-humidity environment will be described. As illustrated in FIG. 2, before the light-shielding film is left to stand in a high-temperature and high-humidity environment, the lens 2 and a light-shielding film interface 7 are in close contact with each other, and almost no white spots are generated in the light-shielding film. However, after the light-shielding film is left to stand in a high-temperature and high-humidity environment, as illustrated in FIG. 3, the lens 2 and the light-shielding film interface 7 are partially detached from each other, and an air layer 12 is formed. The difference in refractive index between the air layer 12 and the lens 2 is large. Therefore, when the light-shielding film is visually observed by being illuminated with light from the lens 2 side, the partially detached portions are observed as white spots 13 as illustrated in FIG. 4, which degrades the appearance. Thus, the partial detachment between the lens 2 and the light-shielding film interface 7 needs to be prevented to suppress the degradation of the appearance caused by the generation of white spots. The size of white spots that can be visually observed and degrade the appearance is about 0.02 mm or more in diameter. By suppressing the generation of such white spots having a diameter of 0.02 mm or more, the degradation of the appearance can be suppressed.

As a result of thorough studies on the cause of the partial detachment (generation of white spots) after the light-shielding film is left to stand in a high-temperature and high-humidity environment, the present inventors have found that the partial detachment is caused by penetration of water, and thus the partial detachment can be suppressed by controlling the penetration of water.

Next, a method for suppressing the partial detachment of the light-shielding film in a high-temperature and high-humidity environment will be described.

The light-shielding film according to an embodiment of the present invention is formed by curing at least an epoxy group-containing compound, an amine curing agent, and a coloring agent. However, an unreacted amine group in the amine curing agent, in particular, a primary amine has high water absorbency. The amount of the unreacted amine having high water absorbency needs to be decreased to suppress the partial detachment of the light-shielding film. In an embodiment of the present invention, the amount of the unreacted amine group can be decreased by decreasing an equivalent ratio which is a ratio of the amount of the amine curing agent added per unit mass to the amount of a resin having an epoxy group per unit mass. Since the refractive index of the amine curing agent is generally low, the internal reflectance can be decreased by decreasing the amount of the amine curing agent added. Although such a decrease in the amount of the amine curing agent added reduces the cross-linking density of the light-shielding film, the reduction in the cross-linking density can be suppressed by any one of a method of high-temperature curing, a method of an increase in curing time, and a method of addition of a curing catalyst or a combined method thereof.

Light-Shielding Paint

Next, materials for the light-shielding paint used for the optical element according to an embodiment of the present invention will be described. Hereafter, the contents of materials for the light-shielding paint are the contents of materials for the light-shielding paint containing a curing agent unless otherwise specified.

The light-shielding paint according to an embodiment of the present invention contains an epoxy group-containing compound, inorganic fine particles, a coloring agent, and an amine curing agent.

The ratio (A'/A) of the mass (A') of the amine curing agent to the active hydrogen equivalent (A) of the amine curing agent indicates the number of active hydrogen atoms per unit mass. Furthermore, the ratio (E'/E) of the mass (E') of the epoxy group-containing compound to the epoxy equivalent (E) of the epoxy group-containing compound indicates the number of epoxy groups per unit mass (epoxy equivalent). In the light-shielding paint according to an embodiment of the present invention, (A'/A)/(E'/E) satisfies formula (1).

$$0.1 \leq [(A'/A)/(E'/E)] \leq 0.45 \qquad \text{Formula (1)}$$

If (A'/A)/(E'/E) of the light-shielding paint is less than 0.1, the cross-linking density decreases and the solvent resistance degrades. If (A'/A)/(E'/E) is more than 0.45, the number of white spots generated after the light-shielding film is left to stand in a high-temperature and high-humidity environment increases.

Hereafter, the epoxy equivalent of the epoxy group-containing compound is measured in conformity with JIS K 7236 (2001). When an epoxy coupling agent is used, the epoxy equivalent of the epoxy group-containing compound indicates an equivalent including the coupling agent. The active hydrogen equivalent of the amine curing agent indicates a number obtained by dividing the molecular weight by the number of functional groups.

Epoxy Group-Containing Compound

The epoxy group-containing compound of the light-shielding paint according to an embodiment of the present invention can be an epoxy resin or an epoxy coupling agent.

The epoxy resin of the light-shielding paint according to an embodiment of the present invention can be a bisphenol A epoxy resin, a bisphenol F epoxy resin, a polyfunctional epoxy resin, a flexible epoxy resin, a brominated epoxy resin, a glycidyl ester epoxy resin, a high-molecular-weight epoxy resin, or a biphenyl epoxy resin. These epoxy resins may be used alone or in combination of two or more as a mixture.

The content of the epoxy resin in the light-shielding paint according to an embodiment of the present invention is, for example, 5.0 mass % or more and 25.0 mass % or less. If the content of the epoxy resin is less than 5.0 mass %, the amount of a resin component in the light-shielding paint is small, which degrades the solvent resistance. If the content of the epoxy resin is more than 25.0 mass %, the refractive index decreases and thus the internal reflection increases.

The content of the epoxy coupling agent in the light-shielding paint according to an embodiment of the present invention is, for example, 0.5 mass % or more and 15.0 mass % or less. If the content of the epoxy coupling agent is less than 0.5 mass %, the adhesion with a base is decreased when the light-shielding film is formed. If the content of the epoxy coupling agent is more than 15.0 mass %, the adhesion with a base is decreased when the light-shielding film is formed. The epoxy coupling agent can be a commercially available silane coupling agent having an epoxy group or a synthesized silane coupling agent. Examples of the silane coupling agent include 2-(3,4-epoxycyclohexyl) ethyltrimethoxysilane, 3-glycidoxypropylmethyldimethoxysilane, 3-glycidoxypropyltrimethoxysilane, 3-glycidoxypropylmethyldiethoxysilane, and 3-glycidoxypropyltriethoxysilane.

Inorganic Fine Particle

The inorganic fine particles used for the light-shielding paint according to an embodiment of the present invention are, for example, silica fine particles or inorganic fine particles having a refractive index (nd) of 2.2 or more, or a mixture of the particles. The number-average particle size of the inorganic fine particles is preferably 5 nm or more and 1000 nm or less and more preferably 10 nm or more and 100 nm or less. If the number-average particle size is less than 5 nm, the stability of the light-shielding paint degrades, which increases the viscosity and easily causes gelation. If the number-average particle size of the inorganic fine particles is more than 1000 nm, an effect of suppressing the generation of white spots of the light-shielding film decreases.

When the silica fine particles are used, irregularities are formed on the surface of the light-shielding film and the reflection at the surface can be suppressed. The silica fine particles also have an effect of preventing sagging.

When the inorganic fine particles having a refractive index (nd) of 2.2 or more are used, the refractive index of the formed light-shielding film can be increased and thus the internal reflection is reduced. Examples of the inorganic fine particles having a refractive index (nd) of 2.2 or more include fine particles of titanium oxide, zirconium oxide, aluminum oxide, yttrium oxide, cadmium oxide, diamond, strontium titanate, and germanium. Among them, inorganic fine particles having a refractive index (nd) of 2.2 or more and 3.5 or less can be particularly used. If the refractive index of the inorganic fine particles is less than 2.2, an increase in the refractive index of the light-shielding film is small. The difference in refractive index between a base and the light-shielding film increases and thus the internal reflection is not effectively suppressed.

The number-average particle size of the inorganic fine particles having a refractive index (nd) of 2.2 or more is preferably 10 nm or more and 100 nm or less and more preferably 10 nm or more and 20 nm or less. The average particle size of the inorganic fine particles having a refractive index (nd) of 2.2 or more can be as small as possible, but it is substantially difficult to disperse the inorganic fine particles with a particle size of 10 nm or less. If the number-average particle size of the inorganic fine particles is more than 100 nm, scattering is easily caused. The average particle size of the inorganic fine particles is an actual size of particles present in the light-shielding film. For example, when the inorganic fine particles are aggregated, the average particle size of the inorganic fine particles is a size of aggregated particles.

The content of the inorganic fine particles in the light-shielding paint according to an embodiment of the present invention is preferably 2.5 mass % or more and 20.0 mass % or less and more preferably 5.0 mass % or more and 7.5 mass % or less. If the content is less than 2.5 mass %, an increase in the refractive index is small and the internal reflection increases. If the content is more than 20.0 mass %, the adhesion and durability of the film unfavorably degrade.

Coloring Agent

The coloring agent used for the light-shielding paint according to an embodiment of the present invention can be a dye, a pigment, or a mixture of dyes and pigments. Any dye may be used as long as the dye absorbs visible light having a wavelength of 400 nm to 700 nm and is soluble in a solvent. A single dye may be used or several dyes with colors such as black, red, yellow, and blue may be mixed with each other. Any pigment may be used as long as the pigment absorbs visible light having a wavelength of 400 nm to 700 nm. The pigment can be carbon black, titanium black, iron oxide, or a copper-iron-manganese composite oxide. The number-average particle size of the pigment is, for example, 5 nm or more and 200 nm or less. If the average particle size of the pigment is less than 5 nm, the stability of the light-shielding paint degrades. If the average particle size of the pigment is more than 200 nm, the internal reflection increases when the light-shielding film is formed.

The content of the coloring agent in the light-shielding paint according to an embodiment of the present invention is preferably 2.5 mass % or more and 15.0 mass % or less and more preferably 5.0 mass % or more and 7.5 mass % or less.

Amine Curing Agent

The light-shielding paint according to an embodiment of the present invention contains an amine curing agent for curing the epoxy group-containing compound contained in the light-shielding paint. The amine curing agent is not particularly limited as long as it satisfies desired characteristics, and a publicly known curing agent can be used. The amine curing agent can be a linear aliphatic amine curing agent, a polyamide-based amine curing agent, an alicyclic amine curing agent, an aromatic amine curing agent, dicyandiamide, or adipic dihydrazide. They may be used alone or in combination of two or more as a mixture.

The content of the amine curing agent in the light-shielding paint according to an embodiment of the present invention is, for example, 0.5 mass % or more and 13.0 mass % or less. If the content of the amine curing agent is less than 0.5 mass %, the degree of curing of the light-shielding film decreases, which degrades the adhesion of the light-shielding film to a base. Furthermore, if the content of the amine curing agent is more than 13.0 mass %, the optical properties degrade.

Organic Solvent

The light-shielding paint according to an embodiment of the present invention can contain an organic solvent because the viscosity can be controlled. The organic solvent used for the light-shielding paint according to an embodiment of the present invention is not particularly limited as long as the organic solvent satisfies the dispersibility of the inorganic fine particles and the solubility of the epoxy group-containing compound, the coloring agent, and the amine curing agent. Examples of the organic solvent include propylene glycol monomethyl ether, propylene glycol monomethyl ether acetate, methyl ethyl ketone, methyl isobutyl ketone, xylene, toluene, isopropyl alcohol, acetone, and ethanol. These organic solvents may be used alone or in combination of two or more as a mixture.

The viscosity of the light-shielding paint is, for example, 10 mPa·s or more and 1000 mPa·s or less. If the viscosity of the light-shielding paint is less than 10 mPa·s, the light-shielding paint is not easily coated. If the viscosity is more than 1000 mPa·s, the light-shielding film may have thin portions after a coating process.

Curing Catalyst

The light-shielding paint according to an embodiment of the present invention can contain a curing catalyst for the purpose of increasing the cross-linking density of the epoxy group-containing compound when the light-shielding film is formed and thus improving the solvent resistance. The curing catalyst used in the present invention is, for example, a tertiary amine or an imidazole compound. Examples of the tertiary amine include benzyldimethylamine, 2-(dimethylaminomethyl)phenol, 2,4,6-tris(diaminomethyl)phenol, and tri-2-ethylhexanoate. Examples of the imidazole compound include 2-methylimidazole, 2-ethyl-4-methylimidazole, 2-undecylimidazole, 2-heptadecylimidazole, 2-phenylimidazole, 1-benzyl-2-methylimidazole, 1-cyanoethyl-2-methylimidazole, and 2,4-diamino-6-[2-methylimidazolyl-(1)]-ethyl-S-triazine.

The content of the curing catalyst in the light-shielding paint according to an embodiment of the present invention is, for example, 0.5 mass % or more and 2.5 mass % or less. If the content of the curing catalyst is less than 0.5 mass %, the solvent resistance of the formed light-shielding film degrades. If the content of the curing catalyst is more than 2.5 mass %, the cross-linking density of the formed light-shielding film increases and the toughness of the film sometimes decreases.

Additive

The light-shielding paint according to an embodiment of the present invention may contain an additive as long as the original purpose is not impaired. The additive is, for example, a fungicide or an antioxidant.

The content of the additive in the light-shielding paint according to an embodiment of the present invention is preferably 5.0 mass % or less and more preferably 3.0 mass % or less.

Light-Shielding Paint Set

Next, a light-shielding paint set according to an embodiment of the present invention will be described.

The light-shielding paint set according to an embodiment of the present invention includes two or more units which include a unit containing an epoxy group-containing compound and a unit containing an amine curing agent. When all the units are mixed with each other, the above-described light-shielding paint is obtained.

The light-shielding paint set according to an embodiment of the present invention separately includes the unit containing an epoxy group-containing compound and the unit containing an amine curing agent, and thus has excellent shelf life. The light-shielding paint set according to an embodiment of the present invention contains the inorganic fine particles and the coloring agent in one or more of the units. That is, the inorganic fine particles and the coloring agent are contained in the unit containing an epoxy group-containing compound, the unit containing an amine curing agent, and/or a unit other than the foregoing units when the light-shielding paint set includes three or more units.

The ratio (A'/A) of the mass (A') of the amine curing agent contained in the light-shielding paint set to the active hydrogen equivalent (A) of the amine curing agent and the ratio (E'/E) of the mass (E') of the epoxy resin to the epoxy equivalent (E) of the epoxy group-containing compound satisfy formula (1) below.

$$0.1 \leq ((A'/A)/(E'/E)) \leq 0.45 \qquad \text{Formula (1)}$$

The light-shielding paint set according to an embodiment of the present invention contains, for example, a curing catalyst in any of the units. The curing catalyst is, for example, a tertiary amine or an imidazole compound.

The light-shielding paint according to an embodiment of the present invention can be obtained by mixing and dispersing the materials contained in all the units of the light-shielding paint set according to an embodiment of the present invention. The mixing and dispersing can be performed with a ball mill, a bead mill, an impact disperser, a planetary disperser, a homogenizer, or a stirrer.

Light-Shielding Film

Next, a light-shielding film according to an embodiment of the present invention will be described.

The light-shielding film according to an embodiment of the present invention is a light-shielding film produced from the light-shielding paint containing the epoxy group-containing compound, the inorganic fine particles, the coloring agent, and the amine curing agent. In the light-shielding paint, the ratio (A'/A) of the mass (A') of the amine curing agent to the active hydrogen equivalent (A) of the amine curing agent and the ratio (E'/E) of the mass (E') of the epoxy group-containing compound to the epoxy equivalent (E) of the epoxy group-containing compound satisfy formula (1) below.

$$0.1 \leq [(A'/A)/(E'/E)] \leq 0.45 \qquad \text{Formula (1)}$$

Next, each component contained in the light-shielding film according to an embodiment of the present invention will be described. The materials contained in the light-shielding film are, for example, the materials described in the light-shielding film. The content of each material for the light-shielding film is as follows.

Epoxy Group-Containing Compound

The content of the epoxy group-containing compound in the light-shielding film according to an embodiment of the present invention is preferably 5.0 mass % or more and 60.0 mass % or less and more preferably 5.0 mass % or more and 40.0 mass % or less. If the content of the epoxy group-containing compound is less than 5.0 mass %, the solvent resistance degrades. If the content of the epoxy group-containing compound is more than 60.0 mass %, the internal reflection increases.

Inorganic Fine Particle

The content of the inorganic fine particles in the light-shielding film according to an embodiment of the present invention is preferably 5.0 mass % or more and 40.0 mass % or less and 10.0 mass % or more and 15.0 mass % or less. If the content is less than 5.0 mass %, an increase in the refractive index is small and thus the internal reflection increases. If the content is more than 40.0 mass %, the adhesion and durability of the film are unfavorably degrade.

Coloring Agent

The content of the coloring agent in the light-shielding film according to an embodiment of the present invention is preferably 5.0 mass % or more and 30.0 mass % or less and more preferably 10.0 mass % or more and 15.0 mass % or less.

Amine Curing Agent

The content of the amine curing agent in the light-shielding film according to an embodiment of the present invention is preferably 1.0 mass % or more and 25.0 mass % or less. If the content of the amine curing agent is less than 1.0 mass %, the degree of curing of the light-shielding film decreases and thus the adhesion of the light-shielding film to a base degrades. If the content of the amine curing agent is more than 25.0 mass %, the optical properties degrade.

Curing Catalyst

The content of the curing catalyst in the light-shielding film according to an embodiment of the present invention is preferably 1.0 mass % or more and 5 mass % or less. If the content of the curing catalyst is less than 1.0 mass %, the solvent resistance of the formed light-shielding film degrades. If the content of the curing catalyst is more than 5.0 mass %, the cross-linking density of the formed light-shielding film increases and the toughness of the film sometimes decreases.

Additive

The content of the additive in the light-shielding film according to an embodiment of the present invention is preferably 15.0 mass % or less and more preferably 10.0 mass % or less.

Optical Element

Next, an optical element according to an embodiment of the present invention will be described.

In the optical element according to an embodiment of the present invention, the light-shielding film is disposed on a portion (peripheral surface) of a base formed of an optical material. The optical element according to an embodiment of the present invention includes the light-shielding film produced from the light-shielding paint containing the epoxy group-containing compound, the inorganic fine particles, the coloring agent, the amine curing agent, and the curing catalyst. In the light-shielding paint, the ratio (A'/A) of the mass (A') of the amine curing agent to the active hydrogen equivalent (A) of the amine curing agent and the ratio (E'/E)

of the mass (E') of the epoxy group-containing compound to the epoxy equivalent (E) of the epoxy group-containing compound satisfy formula (1) below.

$$0.1 \leq [(A'/A)/(E'/E)] \leq 0.45 \quad \text{Formula (1)}$$

The base is, for example, an optical lens or a prism. The difference in refractive index (nd) between the optical material and the light-shielding film is, for example, 0.0 or more and 0.2 or less in order to decrease the internal reflection.

The optical element according to an embodiment of the present invention can be used for optical devices such as cameras, binoculars, microscopes, and semiconductor exposure devices.

Method for Producing Light-Shielding Film

Next, a method for producing the light-shielding film according to an embodiment of the present invention will be described.

The light-shielding film according to an embodiment of the present invention is produced by curing the light-shielding paint. The method for producing a light-shielding film according to an embodiment of the present invention includes applying, onto a base, a light-shielding paint containing an epoxy group-containing compound, inorganic fine particles, a coloring agent, and an amine curing agent and curing the applied light-shielding paint in an atmosphere of 20° C. to 200° C. In the light-shielding paint, the ratio (A'/A) of the mass (A') of the amine curing agent to the active hydrogen equivalent (A) of the amine curing agent and the ratio (E'/E) of the mass (E') of the epoxy group-containing compound to the epoxy equivalent (E) of the epoxy group-containing compound satisfy formula (1) below.

$$0.1 \leq ((A'/A)/(E'/E)) \leq 0.45 \quad \text{Formula (1)}$$

In the step of applying the light-shielding paint, the light-shielding paint can be applied after being dispersed by a desired dispersion method. The dispersion can be performed with a ball mill, a bead mill, an impact disperser, a planetary disperser, a homogenizer, or a stirrer. In the step of applying the light-shielding paint, the light-shielding paint is applied using a brush or trace dispensing.

In the step of curing the light-shielding paint, the applied light-shielding paint is cured in an atmosphere of 20° C. or more and 200° C. or less and preferably in an atmosphere of 40° C. or more and 200° C. or less. If the light-shielding paint is cured at less than 20° C., the cross-linking density decreases and thus the solvent resistance degrades. If the light-shielding paint according to an embodiment of the present invention is cured at more than 200° C., the stress increases and the resulting light-shielding film is easily cracked.

The light-shielding paint used in the method for producing a light-shielding film according to an embodiment of the present invention desirably satisfy the above-described materials and conditions.

Method for Producing Optical Element

Next, a method for producing an optical element according to an embodiment of the present invention will be described.

The method for producing an optical element according to an embodiment of the present invention is a method for producing an optical element including a light-shielding film disposed on a peripheral surface of a base made of an optical material. The method for producing an optical element according to an embodiment of the present invention includes applying a light-shielding paint containing an epoxy group-containing compound, inorganic fine particles, a coloring agent, and an amine curing agent onto a peripheral surface of a base and curing the applied paint in an atmosphere of 20° C. or more and 200° C. or less. In the light-shielding paint used, the ratio (A'/A) of the mass (A') of the amine curing agent to the active hydrogen equivalent (A) of the amine curing agent and the ratio (E'/E) of the mass (E') of the epoxy group-containing compound to the epoxy equivalent (E) of the epoxy group-containing compound satisfy formula (1) below.

$$0.1 \leq ((A'/A)/(E'/E)) \leq 0.45 \quad \text{Formula (1)}$$

The base made of an optical material may be a lens or a prism. The difference in refractive index (nd) between the optical material and the light-shielding film is, for example, 0.0 or more and 0.2 or less in order to reduce the internal reflection.

The method for producing an optical element according to an embodiment of the present invention desirably satisfies the conditions and the like described in the method for producing a light-shielding film.

EXAMPLES

Hereafter, Examples of the present invention will be described.

The preparation of a light-shielding paint, the production of a light-shielding film, the evaluation of optical properties, and the evaluation of appearance in Examples 1 to 16 were performed by the following methods. Measurement of average particle size The average particle size of the inorganic fine particles was measured using a dynamic light scattering instrument (Zeta sizer Nano MPT-2, SYSMEX CORPORATION). A slurry diluted with propylene glycol monomethyl ether was inserted into a cell, and the average of 20 measurements at a voltage of 5 mV was detected. The average particle size was a particle size at a peak of the number distribution.

Evaluation of Optical Properties

Measurement Method of Internal Reflectance

Figure 5:
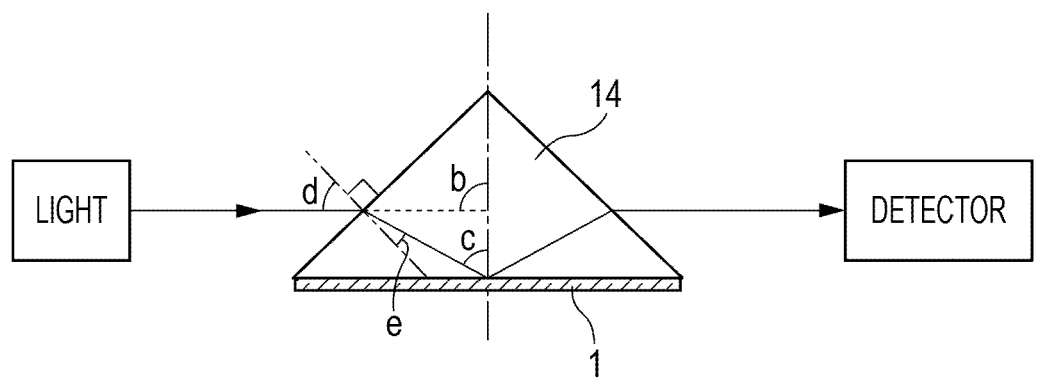
FIG. 5 schematically illustrates a method for measuring internal reflection.
Figure 6:
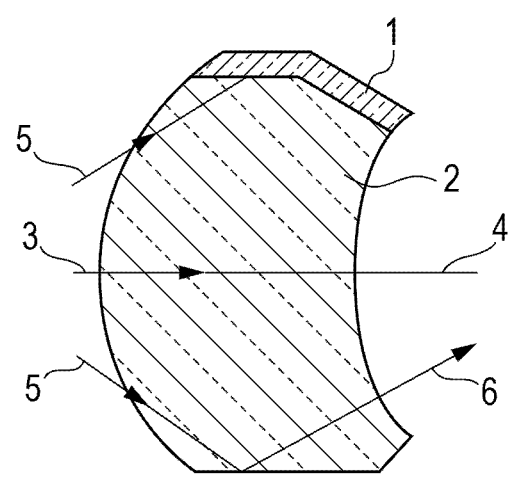
FIG. 6 schematically illustrates an example of a lens on which a light-shielding film for optical elements is formed.

As illustrated in FIG. 5, the internal reflectance was measured using a spectrophotometer (U-4000, Hitachi High-Technologies Corporation). A triangular prism was used as a measurement sample. In a triangular prism 14, the length of one of the sides that sandwich the right angle was 30 mm, the thickness was 10 mm, and the material was S-LaH 53 (nd=1.8, manufactured by Ohara Inc.).

FIG. 5 schematically illustrates a measurement method in which the incident angle b relative to the triangular prism 14 is 90°. First, a measurement method that uses a spectrophotometer will be described with reference to FIG. 5. Light emitted from a spectrophotometer enters the triangular prism 14 at an incident angle b of 90°. Here, the refraction of light occurs due to the difference in refractive index between the air and the triangular prism 14. The incident angle c after the refraction is 68.13°. The angle e relative to the incident angle d after the refraction was calculated from the following calculation formula (3). The incident angle c was calculated from the angle e after the refraction.

$$n = \sin d / \sin e \quad \text{Formula (3)}$$

Subsequently, the light refracted by the triangular prism 14 is reflected at the bottom plane of the triangular prism 14 and emitted from the triangular prism 14. The intensity of the reflected light was detected with a detector in a visible region having a wavelength of 400 nm to 700 nm. A background sample was prepared by applying nothing to a bottom plane of the triangular prism 14 in which three planes of the bottom plane, an incidence plane, and a reflection plane were specular surfaces. A light-shielding film was formed on the bottom plane of the triangular prism 14 in which three planes of the bottom plane, an incidence plane, and a reflection plane were specular surfaces, and the internal reflectance was measured. The internal reflectance was the average of internal reflectances obtained by measuring internal reflection of visible light in a wavelength range of 400 nm to 700 nm at intervals of 1 nm.

Method for Evaluating Number of White Spots After Light-Shielding Film is Left to Stand in High-Temperature and High-Humidity Environment The number of white spots after the light-shielding film was left to stand in a high-temperature and high-humidity environment was evaluated as follows. A glass for measurement was frosted with #240, had a diameter of 30 mm and a thickness of 1 mm, and was made of S-LAL 18. First, a light-shielding paint was applied onto a frosted surface of the glass using a sponge so as to have a thickness of 5.0 μm and cured by the above-described method for producing a light-shielding film. Then, the resulting product was left to stand in a furnace with an ambient temperature of 60° C. and a humidity of 90% for 250 hours to obtain a sample for evaluating white spots. The sample for evaluating white spots was photographed with a microscope. The number of white spots having a diameter of 0.02 mm or more was counted in the obtained image with a size of 6 mm². The number of white spots generated was evaluated based on the criteria below. "A" is given to a light-shielding film having excellent appearance. "B" is given to a light-shielding film having good appearance. "C" is given to a light-shielding film having poor appearance.

A: The number of white spots having a diameter of 0.02 mm or more in the image with a size of 6 mm² was 40 or less.
B: The number of white spots having a diameter of 0.02 mm or more in the image with a size of 6 mm² was 41 to 100.
C: The number of white spots having a diameter of 0.02 mm or more in the image with a size of 6 mm² was 101 or more. Method for evaluating solvent resistance The solvent resistance was evaluated by the following method. First, a light-shielding film having a thickness of 5.0 μm was formed on a freely selected φ30 mm glass by a method for forming a light-shielding film in each Example. The resulting light-shielding film was immersed in an isopropyl alcohol (hereafter referred to as "IPA") solution for 10 minutes to observe whether the IPA was colored or not. "A" is given to a light-shielding film having excellent solvent resistance. "B" and "C" are given to a light-shielding film having good solvent resistance. "D" is given to a light-shielding film having poor solvent resistance.
A: IPA was not colored.
B: IPA was slightly colored, but the tinge of the film did not change.
C: IPA was colored, but the tinge of the film did not change.
D: IPA was colored, and the tinge of the film changed.

Example 1

Preparation of Light-Shielding Paint

In Example 1, a light-shielding paint was prepared by the following method. That is, 42.9 g of propylene glycol monomethyl ether, a dispersant, and 14.3 g of titania fine particles having a refractive index (nd) of 2.2 or more were dispersed in a bead mill (Ultra Apex Mill, Kotobuki Industries Co., Ltd.) using 050 μm beads. Thus, 57.2 g of a slurry in which the number-average particle size of the titania fine particles was 20 nm was obtained. Then, 57.2 g of the slurry obtained by using the bead mill, 21 g of an epoxy resin A, 1 g of a coupling agent, 13 g of a coloring agent, and 40 g of propylene glycol monomethyl ether were weighed and inserted into a ball mill pot. Then, five magnetic balls having a diameter of 20 mm were inserted into the ball mill pot. Titanium oxide (MT-05, TAYCA) was used as the inorganic fine particles having a refractive index (nd) of 2.2 or more. A polycondensate (Epicoat 828, Mitsubishi Chemical Corporation) of 4,4'-isopropylidenediphenol and 1-chloro-2,3-epoxypropane was used as the epoxy resin A. An epoxy-based silane coupling agent (KBM 403, Shin-Etsu Chemical Co., Ltd.) was used as the coupling agent. The ball mill pot containing the prepared paint and the magnetic balls was set on a roll coater and stirring was performed at 66 rpm for 48 hours to prepare a light-shielding paint of Example 1.

A mixture of a black dye, a red dye, a yellow dye, and a blue dye was used as an organic dye. For each dye, any of the dyes listed below was used.

The black dye was selected from VALIFAST BLACK 1821 (Orient Chemical Industries Co., Ltd.), VALRFAST BLACK 3810 (Orient Chemical Industries Co., Ltd.), Oil Black HBB (Orient Chemical Industries Co., Ltd.), and Aizen Spilon Black MHS-Liquid (Hodogaya Chemical Co., Ltd.).

The red dye was selected from VALIFAST RED 3320 (Orient Chemical Industries Co., Ltd.) and Aizen Spilon Red BEH S-Liquid (Hodogaya Chemical Co., Ltd.).

The yellow dye was selected from OIL YELLOW 129, VALIFAST YELLOW 3108, and Aizen Spilon Yellow RH S-Liquid (Hodogaya Chemical Co., Ltd.).

The blue dye was selected from VALIFAST BLUE 1605 (Orient Chemical Industries Co., Ltd.), VALIFAST BLUE 2650 (Orient Chemical Industries Co., Ltd.), VALIFAST BLUE 2606 (Orient Chemical Industries Co., Ltd.), and VALIFAST BLUE 2620 (Orient Chemical Industries Co., Ltd.).

Production of Light-Shielding Film

In Example 1, a light-shielding film was produced by the following method. That is, 1.9 g of an amine curing agent A and 1 g of a curing catalyst A were added to 132.2 g of the light-shielding paint, and stirring was performed using a roll coater for 30 minutes. An aliphatic amine curing agent was used as the amine curing agent A (ADEKA Hardener EH6019, ADEKA Corporation), and 2,4,6-tris(diaminomethyl)phenol was used as the curing catalyst A. The stirring condition of the roll coater was 66 rpm. The epoxy equivalent of the epoxy resin A was 190 g/eq, the epoxy equivalent of the coupling agent was 236 g/eq, and (E'/E)=0.111+0.004=0.115. The active hydrogen equivalent of the amine curing agent A was 80 g/eq, and (A'/A)=0.011. As a result of the calculation based on the formula (1), the equivalent ratio (A'/A)/(E'/E) was 0.1.

The obtained light-shielding paint/curing agent solution was applied onto a glass substrate or a lens for evaluation so as to have a particular thickness and dried at room temperature for 60 minutes. After the light-shielding paint was dried, the light-shielding paint was cured in a thermostatic oven at 40° C. for 8 hours to produce a light-shielding film of Example 1.

Examples 2 to 16

In each of Examples 2 to 16, a light-shielding paint and a light-shielding film were produced in the same manner as in Example 1, except that the materials and conditions were changed to those shown in Tables 1 to 4.

TABLE 1

| | | | | Light-shielding paint in Example 1 | Light-shielding paint in Example 2 |
|---|---|---|---|---|---|
| Light-shielding paint | Epoxy group-containing compound | Epoxy resin | Material | Epoxy resin A | Epoxy resin A |
| | | | Epoxy equivalent (g/eq) | 190 | 190 |
| | | | Amount added (g) | 21 | 21 |
| | | Coupling agent | Material | Epoxy-based silane coupling agent A | Epoxy-based silane coupling agent A |
| | | | Epoxy equivalent (g/eq) | 236 | 236 |
| | | | Amount added (g) | 1 | 1 |
| | Amine curing agent | | Material | Curing agent A | Curing agent A |
| | | | Active hydrogen equivalent (g/eq) | 80 | 80 |
| | | | Amount added (g) | 0.9 | 1.8 |
| | | | A'/A | 0.011 | 0.023 |
| | | | E'/E | 0.115 | 0.115 |
| | | | Equivalent ratio (A'/A)/(E'/E) | 0.10 | 0.20 |
| | Curing catalyst | | Material | 2,4,6-tris(diaminomethyl)phenol | 2,4,6-tris(diaminomethyl)phenol |
| | | | Amount added (g) | 0.5 | 0.5 |
| | Coloring agent | | Material | Dye | Dye |
| | | | Type | 1. Black dye<br>2. Red dye<br>3. Yellow dye<br>4. Blue dye | 1. Black dye<br>2. Red dye<br>3. Yellow dye<br>4. Blue dye |
| | | | Amount added | 1. 1.54<br>2. 3.82<br>3. 1.54<br>4. 6.1 | 1. 1.54<br>2. 3.82<br>3. 1.54<br>4. 6.2 |
| | | | Total amount added (g) | 13 | 13 |
| | Solvent | | Material | Propylene glycol monomethyl ether | Propylene glycol monomethyl ether |
| | | | Amount added (g) | 40 | 40 |
| | Inorganic fine particles | | Material | Titania (dispersed in propylene glycol monomethyl ether, solid content: 25 wt %) | Titania (dispersed in propylene glycol monomethyl ether, solid content: 25 wt %) |
| | | | Amount containing solvent (g) | 57.2 | 57.2 |
| Light-shielding film | | | Curing temperature | 40° C. | 40° C. |
| | | | Curing time | 8 hours | 8 hours |

| | | | | Light-shielding paint in Example 3 | Light-shielding paint in Example 4 |
|---|---|---|---|---|---|
| Light-shielding paint | Epoxy group-containing compound | Epoxy resin | Material | Epoxy resin A | Epoxy resin A |
| | | | Epoxy equivalent (g/eq) | 190 | 190 |
| | | | Amount added (g) | 21 | 10 |
| | | Coupling agent | Material | Epoxy-based silane coupling agent A | Epoxy-based silane coupling agent A |
| | | | Epoxy equivalent (g/eq) | 236 | 236 |
| | | | Amount added (g) | 1 | 12 |
| | Amine curing agent | | Material | Curing agent A | Curing agent A |
| | | | Active hydrogen equivalent (g/eq) | 80 | 80 |
| | | | Amount added (g) | 4.1 | 0.85 |
| | | | A'/A | 0.051 | 0.011 |
| | | | E'/E | 0.115 | 0.103 |
| | | | Equivalent ratio (A'/A)/(E'/E) | 0.45 | 0.10 |
| | Curing catalyst | | Material | 2,4,6-tris(diaminomethyl)phenol | 2,4,6-tris(diaminomethyl)phenol |
| | | | Amount added (g) | 0.5 | 0.5 |
| | Coloring agent | | Material | Dye | Dye |
| | | | Type | 1. Black dye<br>2. Red dye<br>3. Yellow dye<br>4. Blue dye | 1. Black dye<br>2. Red dye<br>3. Yellow dye<br>4. Blue dye |
| | | | Amount added | 1. 1.54<br>2. 3.82<br>3. 1.54<br>4. 6.3 | 1. 1.54<br>2. 3.82<br>3. 1.54<br>4. 6.4 |
| | | | Total amount added (g) | 13 | 13 |
| | Solvent | | Material | Propylene glycol monomethyl ether | Propylene glycol monomethyl ether |

TABLE 1-continued

|  |  |  |  |  |
|---|---|---|---|---|
|  | Inorganic fine particles | Amount added (g) | 40 | 40 |
|  |  | Material | Titania (dispersed in propylene glycol monomethyl ether, solid content: 25 wt %) | Titania (dispersed in propylene glycol monomethyl ether, solid content: 25 wt %) |
|  |  | Amount containing solvent (g) | 57.2 | 57.2 |
| Light-shielding film |  | Curing temperature | 40° C. | 40° C. |
|  |  | Curing time | 8 hours | 8 hours |

TABLE 2

|  |  |  |  | Light-shielding paint in Example 5 | Light-shielding paint in Example 6 |
|---|---|---|---|---|---|
| Light-shielding paint | Epoxy group-containing compound | Epoxy resin | Material | Epoxy resin A | Epoxy resin A |
|  |  |  | Epoxy equivalent (g/eq) | 190 | 190 |
|  |  |  | Amount added (g) | 10 | 10 |
|  |  | Coupling agent | Material | Epoxy-based silane coupling agent A | Epoxy-based silane coupling agent A |
|  |  |  | Epoxy equivalent (g/eq) | 236 | 236 |
|  |  |  | Amount added (g) | 12 | 12 |
|  | Amine curing agent |  | Material | Curing agent A | Curing agent A |
|  |  |  | Active hydrogen equivalent (g/eq) | 80 | 80 |
|  |  |  | Amount added (g) | 1.65 | 3.7 |
|  |  |  | A'/A | 0.021 | 0.046 |
|  |  |  | E'/E | 0.103 | 0.103 |
|  |  |  | Equivalent ratio (A'/A)/(E'/E) | 0.20 | 0.45 |
|  | Curing catalyst |  | Material | 2,4,6-tris(diaminomethyl)phenol | 2,4,6-tris(diaminomethyl)phenol |
|  |  |  | Amount added (g) | 0.5 | 0.5 |
|  | Coloring agent |  | Material | Dye | Dye |
|  |  |  | Type | 1. Black dye<br>2. Red dye<br>3. Yellow dye<br>4. Blue dye | 1. Black dye<br>2. Red dye<br>3. Yellow dye<br>4. Blue dye |
|  |  |  | Amount added | 1. 1.54<br>2. 3.82<br>3. 1.54<br>4. 6.5 | 1. 1.54<br>2. 3.82<br>3. 1.54<br>4. 6.6 |
|  |  |  | Total amount added (g) | 13 | 13 |
|  | Solvent |  | Material | Propylene glycol monomethyl ether | Propylene glycol monomethyl ether |
|  |  |  | Amount added (g) | 40 | 40 |
|  | Inorganic fine particles |  | Material | Titania (dispersed in propylene glycol monomethyl ether, solid content: 25 wt %) | Titania (dispersed in propylene glycol monomethyl ether, solid content: 25 wt %) |
|  |  |  | Amount containing solvent (g) | 57.2 | 57.2 |
| Light-shielding film |  | Curing temperature |  | 40° C. | 40° C. |
|  |  | Curing time |  | 8 hours | 8 hours |

|  |  |  |  | Light-shielding paint in Example 7 | Light-shielding paint in Example 8 |
|---|---|---|---|---|---|
| Light-shielding paint | Epoxy group-containing compound | Epoxy resin | Material | Epoxy resin A | Epoxy resin A |
|  |  |  | Epoxy equivalent (g/eq) | 190 | 190 |
|  |  |  | Amount added (g) | 10 | 10 |
|  |  | Coupling agent | Material | Epoxy-based silane coupling agent A | Epoxy-based silane coupling agent A |
|  |  |  | Epoxy equivalent (g/eq) | 236 | 236 |
|  |  |  | Amount added (g) | 12 | 12 |
|  | Amine curing agent |  | Material | Curing agent B | Curing agent C |
|  |  |  | Active hydrogen equivalent (g/eq) | 114 | 81 |
|  |  |  | Amount added (g) | 2.4 | 1.7 |
|  |  |  | A'/A | 0.021 | 0.021 |
|  |  |  | E'/E | 0.103 | 0.103 |
|  |  |  | Equivalent ratio (A'/A)/(E'/E) | 0.20 | 0.20 |
|  | Curing catalyst |  | Material | 2,4,6-tris(diaminomethyl)phenol | 2,4,6-tris(diaminomethyl)phenol |
|  |  |  | Amount added (g) | 0.5 | 0.5 |
|  | Coloring agent |  | Material | Dye | Dye |
|  |  |  | Type | 1. Black dye | 1. Black dye |

TABLE 2-continued

|  |  |  |  |  |
|---|---|---|---|---|
|  |  |  | 2. Red dye<br>3. Yellow dye<br>4. Blue dye | 2. Red dye<br>3. Yellow dye<br>4. Blue dye |
|  |  | Amount added | 1. 1.54<br>2. 3.82<br>3. 1.54<br>4. 6.7 | 1. 1.54<br>2. 3.82<br>3. 1.54<br>4. 6.8 |
|  | Solvent | Total amount added (g)<br>Material | 13<br>Propylene glycol monomethyl ether | 13<br>Propylene glycol monomethyl ether |
|  | Inorganic fine particles | Amount added (g)<br>Material | 40<br>Titania (dispersed in propylene glycol monomethyl ether, solid content: 25 wt %) | 40<br>Titania (dispersed in propylene glycol monomethyl ether, solid content: 25 wt %) |
|  |  | Amount containing solvent (g) | 57.2 | 57.2 |
| Light-shielding film |  | Curing temperature<br>Curing time | 40° C.<br>8 hours | 40° C.<br>8 hours |

TABLE 3

|  |  |  |  | Light-shielding paint in Example 9 | Light-shielding paint in Example 10 |
|---|---|---|---|---|---|
| Light-shielding paint | Epoxy group-containing compound | Epoxy resin | Material<br>Epoxy equivalent (g/eq)<br>Amount added (g) | Epoxy resin A<br>190<br>10 | Epoxy resin A<br>190<br>10 |
|  |  | Coupling agent | Material<br>Epoxy equivalent (g/eq)<br>Amount added (g) | Epoxy-based silane coupling agent A<br>236<br>12 | Epoxy-based silane coupling agent A<br>236<br>12 |
|  | Amine curing agent |  | Material<br>Active hydrogen equivalent (g/eq)<br>Amount added (g)<br>A'/A<br>E'/E<br>Equivalent ratio (A'/A)/(E'/E) | Curing agent A<br>80<br>1.65<br>0.021<br>0.103<br>0.20 | Curing agent A<br>80<br>1.65<br>0.021<br>0.103<br>0.20 |
|  |  | Curing catalyst | Material<br>Amount added (g) | —<br>0 | 2,4,6-tris(diaminomethyl)phenol<br>1 |
|  |  | Coloring agent | Material<br>Type | Dye<br>1. Black dye<br>2. Red dye<br>3. Yellow dye<br>4. Blue dye | Dye<br>1. Black dye<br>2. Red dye<br>3. Yellow dye<br>4. Blue dye |
|  |  |  | Amount added | 1. 1.54<br>2. 3.82<br>3. 1.54<br>4. 6.9 | 1. 1.54<br>2. 3.82<br>3. 1.54<br>4. 6.10 |
|  | Solvent |  | Total amount added (g)<br>Material | 13<br>Propylene glycol monomethyl ether | 13<br>Propylene glycol monomethyl ether |
|  | Inorganic fine particles |  | Amount added (g)<br>Material | 40<br>Titania (dispersed in propylene glycol monomethyl ether, solid content: 25 wt %) | 40<br>Titania (dispersed in propylene glycol monomethyl ether, solid content: 25 wt %) |
|  |  |  | Amount containing solvent (g) | 57.2 | 57.2 |
| Light-shielding film |  |  | Curing temperature<br>Curing time | 40° C.<br>8 hours | 40° C.<br>8 hours |

|  |  |  |  | Light-shielding paint in Example 11 | Light-shielding paint in Example 12 |
|---|---|---|---|---|---|
| Light-shielding paint | Epoxy group-containing compound | Epoxy resin | Material<br>Epoxy equivalent (g/eq)<br>Amount added (g) | Epoxy resin A<br>190<br>10 | Epoxy resin A<br>190<br>10 |
|  |  | Coupling agent | Material<br>Epoxy equivalent (g/eq)<br>Amount added (g) | Epoxy-based silane coupling agent A<br>236<br>12 | Epoxy-based silane coupling agent A<br>236<br>12 |

TABLE 3-continued

|  |  |  | Curing agent A | Curing agent A |
|---|---|---|---|---|
| Amine curing agent | Material |  | Curing agent A | Curing agent A |
|  | Active hydrogen equivalent (g/eq) |  | 80 | 80 |
|  | Amount added (g) |  | 1.65 | 1.65 |
|  | A'/A |  | 0.021 | 0.021 |
|  | E'/E |  | 0.103 | 0.103 |
|  | Equivalent ratio (A'/A)/(E'/E) |  | 0.20 | 0.20 |
| Curing catalyst | Material |  | 2,4,6-tris(diaminomethyl)phenol | 2,4,6-tris(diaminomethyl)phenol |
|  | Amount added (g) |  | 3 | 4 |
| Coloring agent | Material |  | Dye | Dye |
|  | Type |  | 1. Black dye<br>2. Red dye<br>3. Yellow dye<br>4. Blue dye | 1. Black dye<br>2. Red dye<br>3. Yellow dye<br>4. Blue dye |
|  | Amount added |  | 1. 1.54<br>2. 3.82<br>3. 1.54<br>4. 6.11 | 1. 1.54<br>2. 3.82<br>3. 1.54<br>4. 6.12 |
|  | Total amount added (g) |  | 13 | 13 |
| Solvent | Material |  | Propylene glycol monomethyl ether | Propylene glycol monomethyl ether |
|  | Amount added (g) |  | 40 | 40 |
| Inorganic fine particles | Material |  | Titania (dispersed in propylene glycol monomethyl ether, solid content: 25 wt %) | Titania (dispersed in propylene glycol monomethyl ether, solid content: 25 wt %) |
|  | Amount containing solvent (g) |  | 57.2 | 57.2 |
| Light-shielding film | Curing temperature |  | 40° C. | 40° C. |
|  | Curing time |  | 8 hours | 8 hours |

TABLE 4

|  |  |  |  | Light-shielding paint in Example 13 | Light-shielding paint in Example 14 |
|---|---|---|---|---|---|
| Light-shielding paint | Epoxy group-containing compound | Epoxy resin | Material | Epoxy resin A | Epoxy resin A |
|  |  |  | Epoxy equivalent (g/eq) | 190 | 190 |
|  |  |  | Amount added (g) | 10 | 10 |
|  |  | Coupling agent | Material | Epoxy-based silane coupling agent A | Epoxy-based silane coupling agent A |
|  |  |  | Epoxy equivalent (g/eq) | 236 | 236 |
|  |  |  | Amount added (g) | 12 | 12 |
|  | Amine curing agent |  | Material | Curing agent A | Curing agent A |
|  |  |  | Active hydrogen equivalent (g/eq) | 80 | 80 |
|  |  |  | Amount added (g) | 1.65 | 1.65 |
|  |  |  | A'/A | 0.021 | 0.021 |
|  |  |  | E'/E | 0.103 | 0.103 |
|  |  |  | Equivalent ratio (A'/A)/(E'/E) | 0.20 | 0.20 |
|  | Curing catalyst |  | Material | Benzyldimethylamine | 2,4,6-tris(diaminomethyl)phenol |
|  |  |  | Amount added (g) | 0.5 | 0.5 |
|  | Coloring agent |  | Material | Dye | Dye |
|  |  |  | Type | 1. Black dye<br>2. Red dye<br>3. Yellow dye<br>4. Blue dye | 1. Black dye<br>2. Red dye<br>3. Yellow dye<br>4. Blue dye |
|  |  |  | Amount added | 1. 1.54<br>2. 3.82<br>3. 1.54<br>4. 6.5 | 1. 1.54<br>2. 3.82<br>3. 1.54<br>4. 6.5 |
|  |  |  | Total amount added (g) | 13 | 13 |
|  | Solvent |  | Material | Propylene glycol monomethyl ether | Propylene glycol monomethyl ether |
|  |  |  | Amount added (g) | 40 | 40 |
|  | Inorganic fine particles |  | Material | Titania (dispersed in propylene glycol monomethyl ether, solid content: 25 wt %) | Zirconia (dispersed in propylene glycol monomethyl ether, solid content: 25 wt %) |
|  |  |  | Amount containing solvent (g) | 57.2 | 57.2 |

TABLE 4-continued

| Light-shielding film | | | Curing temperature<br>Curing time | 40° C.<br>8 hours | 40° C.<br>8 hours |
|---|---|---|---|---|---|
| | | | | Light-shielding paint in Example 15 | Light-shielding paint in Example 16 |
| Light-shielding paint | Epoxy group-containing compound | Epoxy resin | Material<br>Epoxy equivalent (g/eq)<br>Amount added (g) | Epoxy resin A<br>190<br>10 | Epoxy resin A<br>190<br>10 |
| | | Coupling agent | Material<br>Epoxy equivalent (g/eq)<br>Amount added (g) | Epoxy-based silane coupling agent A<br>236<br>12 | Epoxy-based silane coupling agent A<br>236<br>12 |
| | Amine curing agent | | Material<br>Active hydrogen equivalent (g/eq)<br>Amount added (g)<br>A'/A<br>E'/E | Curing agent A<br>80<br>1.65<br>0.021<br>0.103 | Curing agent A<br>80<br>1.65<br>0.021<br>0.103 |
| | | | Equivalent ratio (A'/A)/(E'/E) | 0.20 | 0.20 |
| | Curing catalyst | | Material<br>Amount added (g) | 2,4,6-tris(diaminomethyl)phenol<br>0.5 | 2,4,6-tris(diaminomethyl)phenol<br>0.5 |
| | Coloring agent | | Material<br>Type | Dye<br>1. Black dye<br>2. Red dye<br>3. Yellow dye<br>4. Blue dye | Dye<br>1. Black dye<br>2. Red dye<br>3. Yellow dye<br>4. Blue dye |
| | | | Amount added | 1. 1.54<br>2. 3.82<br>3. 1.54<br>4. 6.5 | 1. 1.54<br>2. 3.82<br>3. 1.54<br>4. 6.5 |
| | | | Total amount added (g) | 13 | 13 |
| | Solvent | | Material<br>Amount added (g) | Propylene glycol monomethyl ether<br>40 | Propylene glycol monomethyl ether<br>40 |
| | Inorganic fine particles | | Material<br>Amount containing solvent (g) | Titania (dispersed in propylene glycol monomethyl ether, solid content: 25 wt %)<br>57.2 | Titania (dispersed in propylene glycol monomethyl ether, solid content: 25 wt %)<br>57.2 |
| Light-shielding film | | | Curing temperature<br>Curing time | 20° C.<br>24 hours | 200° C.<br>0.5 hours |

Evaluation Results

Tables 5 to 8 show the evaluation results of the internal reflectance, the number of white spots after the light-shielding film was left to stand in a high-temperature and high-humidity environment, and the solvent resistance of the light-shielding paint and light-shielding film in Examples 1 to 16, the evaluation results being obtained by the above-described measurement methods.

In terms of good measurement results, the internal reflection is, for example, 20% or less. The number of white spots having a diameter of 0.02 mm or more after the light-shielding film is left to stand in a high-temperature and high-humidity environment is, for example, 100 or less in an image with a size of 6 mm². The solvent resistance is, for example, at a level at which the tinge of the light-shielding film does not change after the immersion in IPA.

As shown in FIG. 5, the physical properties of the light-shielding paint and light-shielding film for optical elements in Example 1 in which the equivalent ratio was 0.01 were measured. As a result of the evaluation of optical properties, the internal reflectance was 15%, which was a good result. As a result of the evaluation of the number of white spots after the light-shielding film was left to stand in a high-temperature and high-humidity environment, the number of white spots having a diameter of 0.02 mm or more in an image with a size of 6 mm² was 41 to 100, which was a good result. As a result of the evaluation of solvent resistance, IPA was slightly colored, which was a good result.

Table 5 shows the physical properties of the light-shielding film formed of the light-shielding paint for optical elements in Example 2 in which the same light-shielding paint as in Example 1 was used except that the curing agent A was added so that the equivalent ratio was as large as 0.20. The internal reflectance was 17%, which was a good result. As a result of the evaluation of the number of white spots after the light-shielding film was left to stand in a high-temperature and high-humidity environment, the number of white spots having a diameter of 0.02 mm or more in an image with a size of 6 mm² was 41 to 100, which was a good result. As a result of the evaluation of solvent resistance, IPA was not colored, which was a good result.

Table 5 shows the physical properties of the light-shielding film formed of the light-shielding paint for optical elements in Example 3 in which the same light-shielding paint as in Example 1 was used except that the curing agent A was added so that the equivalent ratio was as large as 0.45. The internal reflectance was 20%, which was a good result. As a result of the evaluation of the number of white spots after the light-shielding film was left to stand in a high-temperature and high-humidity environment, the number of white spots having a diameter of 0.02 mm or more in an image with a size of 6 mm² was 41 to 100, which was a good result. As a result of the evaluation of solvent resistance, IPA was not colored, which was a good result.

Table 5 shows the physical properties of the light-shielding film formed of the light-shielding paint for optical elements in Example 4 in which the same light-shielding paint as in Example 1 was used except that the amount of the epoxy resin A added was 10 g, the amount of the epoxy-based silane coupling agent added was 12 g, and the amount of the curing agent A added was 0.85 g. The internal reflectance was 13%, which was a good result. As a result of the evaluation of the number of white spots after the light-shielding film was left to stand in a high-temperature and high-humidity environment, the number of white spots having a diameter of 0.02 mm or more in an image with a size of 6 mm² was 41 to 100, which was a good result. As a result of the evaluation of solvent resistance, IPA was colored, but the tinge of the film did not change.

Table 6 shows the physical properties of the light-shielding film formed of the light-shielding paint for optical elements in Example 5 in which the same light-shielding paint as in Example 4 was used except that the curing agent A was added so that the equivalent ratio was as large as 0.2. The internal reflectance was 15%, which was a good result. As a result of the evaluation of the number of white spots after the light-shielding film was left to stand in a high-temperature and high-humidity environment, the number of white spots having a diameter of 0.02 mm or more in an image with a size of 6 mm² was 41 to 100, which was a good result. As a result of the evaluation of solvent resistance, IPA was slightly colored, which was a good result.

Table 6 shows the physical properties of the light-shielding film formed of the light-shielding paint for optical elements in Example 6 in which the same light-shielding paint as in Example 4 was used except that the curing agent A was added so that the equivalent ratio was as large as 0.45. The internal reflectance was 18%. As a result of the evaluation of the number of white spots after the light-shielding film was left to stand in a high-temperature and high-humidity environment, the number of white spots having a diameter of 0.02 mm or more in an image with a size of 6 mm² was 41 to 100, which was a good result. As a result of the evaluation of solvent resistance, IPA was not colored, which was a good result.

Table 6 shows the physical properties of the light-shielding film formed of the light-shielding paint for optical elements in Example 7 in which the same light-shielding paint as in Example 5 was used except that 2.4 g of a curing agent B was added. ADEKA Hardener EH551CH (manufactured by ADEKA Corporation), which is an aromatic amine curing agent, was used as the curing agent B. The internal reflectance was 13%, which was a good result. As a result of the evaluation of the number of white spots after the light-shielding film was left to stand in a high-temperature and high-humidity environment, the number of white spots having a diameter of 0.02 mm or more in an image with a size of 6 mm² was 41 to 100, which was a good result. As a result of the evaluation of solvent resistance, IPA was slightly colored, which was a good result.

Table 6 shows the physical properties of the light-shielding film formed of the light-shielding paint for optical elements in Example 8 in which the same light-shielding paint as in Example 5 was used except that 1.7 g of a curing agent C was added. JEFFAMINE T-403 (manufactured by Mitsui Fine Chemicals, Inc.), which is a polyfunctional amine curing agent, was used as the curing agent C. The internal reflectance was 14%, which was a good result. As a result of the evaluation of the number of white spots after the light-shielding film was left to stand in a high-temperature and high-humidity environment, the number of white spots having a diameter of 0.02 mm or more in an image with a size of 6 mm² was 41 to 100, which was a good result. As a result of the evaluation of solvent resistance, IPA was slightly colored, which was a good result.

Table 7 shows the physical properties of the light-shielding film formed of the light-shielding paint for optical elements in Example 9 in which the same light-shielding paint as in Example 5 was used except that the curing catalyst was not used. The internal reflectance was 9%, which was a good result. As a result of the evaluation of the number of white spots after the light-shielding film was left to stand in a high-temperature and high-humidity environment, the number of white spots having a diameter of 0.02 mm or more in an image with a size of 6 mm² was 41 to 100, which was a good result. As a result of the evaluation of solvent resistance, IPA was colored, but the tinge of the film did not change.

Table 7 shows the physical properties of the light-shielding film formed of the light-shielding paint for optical elements in Example 10 in which the same light-shielding paint as in Example 5 was used except that the amount of the curing catalyst added was 1.0 g. The internal reflectance was 17%, which was a good result. As a result of the evaluation of the number of white spots after the light-shielding film was left to stand in a high-temperature and high-humidity environment, the number of white spots having a diameter of 0.02 mm or more in an image with a size of 6 mm² was 41 to 100, which was a good result. As a result of the evaluation of solvent resistance, IPA was not colored.

Table 7 shows the physical properties of the light-shielding film formed of the light-shielding paint for optical elements in Example 11 in which the same light-shielding paint as in Example 5 was used except that the amount of the curing catalyst added was 3.0 g. The internal reflectance was 19%. As a result of the evaluation of the number of white spots after the light-shielding film was left to stand in a high-temperature and high-humidity environment, the number of white spots having a diameter of 0.02 mm or more in an image with a size of 6 mm² was 41 to 100, which was a good result. As a result of the evaluation of solvent resistance, IPA was not colored.

Table 7 shows the physical properties of the light-shielding film formed of the light-shielding paint for optical elements in Example 12 in which the same light-shielding paint as in Example 5 was used except that the amount of the curing catalyst added was 4.0 g. The internal reflectance was 20%. As a result of the evaluation of the number of white spots after the light-shielding film was left to stand in a high-temperature and high-humidity environment, the number of white spots having a diameter of 0.02 mm or more in an image with a size of 6 mm² was 41 to 100, which was a good result. As a result of the evaluation of solvent resistance, IPA was not colored. However, the film was slightly detached 1500 hours after the light-shielding film was left to stand in a high-temperature and high-humidity environment.

Table 8 shows the physical properties of the light-shielding film formed of the light-shielding paint for optical elements in Example 13 in which the same light-shielding paint as in Example 5 was used except that benzyldimethylamine was used as the curing catalyst. The internal reflectance was 15%, which was a good result. As a result of the evaluation of the number of white spots after the light-shielding film was left to stand in a high-temperature and high-humidity environment, the number of white spots having a diameter of 0.02 mm or more in an image with a size of 6 mm² was 41 to 100, which was a good result. As a result of the evaluation of solvent resistance, IPA was slightly colored.

Table 8 shows the physical properties of the light-shielding film formed of the light-shielding paint for optical elements in Example 14 in which the same light-shielding paint as in Example 5 was used except that zirconia was used as the inorganic fine particles. The internal reflectance was 20%. As a result of the evaluation of the number of white spots after the light-shielding film was left to stand in a high-temperature and high-humidity environment, the number of white spots having a diameter of 0.02 mm or more in an image with a size of 6 mm² was 41 to 100, which was a good result. As a result of the evaluation of solvent resistance, IPA was slightly colored.

Table 8 shows the physical properties of the light-shielding film formed of the light-shielding paint for optical elements in Example 15 in which the same light-shielding paint as in Example 5 was cured except that the curing temperature was changed to 20° C. and the curing time was changed to 24 hours. The internal reflectance was 17%, which was a good result. As a result of the evaluation of the number of white spots after the light-shielding film was left to stand in a high-temperature and high-humidity environment, the number of white spots having a diameter of 0.02 mm or more in an image with a size of 6 mm² was 41 to 100, which was a good result. As a result of the evaluation of solvent resistance, IPA was colored, but the tinge of the film did not change.

Table 8 shows the physical properties of the light-shielding film formed of the light-shielding paint for optical elements in Example 16 in which the same light-shielding paint as in Example 5 was cured except that the curing temperature was changed to 200° C. and the curing time was changed to 0.5 hours. The internal reflectance was 12%, which was a good result. As a result of the evaluation of the number of white spots after the light-shielding film was left to stand in a high-temperature and high-humidity environment, the number of white spots having a diameter of 0.02 mm or more in an image with a size of 6 mm² was 40 or less, which was a good result. As a result of the evaluation of solvent resistance, IPA was not colored.

TABLE 5

|  | Example 1 | Example 2 | Example 3 | Example 4 |
|---|---|---|---|---|
| Internal reflectance | 15 | 17 | 20 | 13 |
| Number of white spots after light-shielding film was left to stand in high-temperature and high-humidity environment (/mm²) | B | B | B | B |
| Solvent resistance | B | B | A | B |

TABLE 6

|  | Example 5 | Example 6 | Example 7 | Example 8 |
|---|---|---|---|---|
| Internal reflectance | 15 | 18 | 13 | 14 |
| Number of white spots after light-shielding film was left to stand in high-temperature and high-humidity environment (/mm²) | B | B | B | B |
| Solvent resistance | B | A | B | B |

TABLE 7

|  | Example 9 | Example 10 | Example 11 | Example 12 |
|---|---|---|---|---|
| Internal reflectance | 9 | 17 | 19 | 20 |
| Number of white spots after light-shielding film was left to stand in high-temperature and high-humidity environment (/mm²) | B | B | B | B |
| Solvent resistance | C | A | A | A |

TABLE 8

|  | Example 13 | Example 14 | Example 15 | Example 16 |
|---|---|---|---|---|
| Internal reflectance | 15 | 19 | 17 | 12 |
| Number of white spots after light-shielding film was left to stand in high-temperature and high-humidity environment (/mm²) | C | B | B | A |
| Solvent resistance | B | B | B | A |

Comparative Examples 1 to 5

The preparation of the light-shielding paint, the production of the light-shielding film, the evaluation of the optical properties, and the evaluation of the appearance for comparison were performed in the same manner as in Examples 1 to 16. The points different from those in Examples 1 to 16 will be described below.

Tables 9 and 10 show the types of epoxy resins, coupling agents, amine curing agents, curing catalysts, coloring agents, solvents, and inorganic fine particles constituting the light-shielding paint of each of Comparative Examples 1, 2, 3, 4, and 5 and the mixing ratio of the foregoing and the equivalent ratio.

Tables 11 and 12 show the results of the evaluation performed using the light-shielding paint of each of Comparative Examples 1, 2, 3, 4, and 5.

Table 11 shows the physical properties of the light-shielding film formed of the light-shielding paint for optical elements in Comparative Example 1 in which the same light-shielding paint as in Example 5 was used except that the curing agent A was added so that the equivalent ratio was as small as 0.05. The internal reflectance was 12%, which was a good result. As a result of the evaluation of the number of white spots after the light-shielding film was left to stand in a high-temperature and high-humidity environment, the number of white spots having a diameter of 0.02 mm or more in an image with a size of 6 mm² was 101 or more, which was a poor result. As a result of the solvent resistance test, IPA was colored, the film was detached, and the tinge of the film changed.

Table 11 shows the physical properties of the light-shielding film formed of the light-shielding paint for optical elements in Comparative Example 2 in which the same light-shielding paint as in Example 5 was used except that the curing agent A was added so that the equivalent ratio was as large as 0.55. The internal reflectance was 23%, which was a poor result. As a result of the evaluation of the number of white spots after the light-shielding film was left to stand in a high-temperature and high-humidity environment, the number of white spots having a diameter of 0.02 mm or more in an image with a size of 6 mm² was 101 or more, which was a poor result. As a result of the solvent resistance test, IPA was not colored.

Table 11 shows the physical properties of the light-shielding film formed of the light-shielding paint for optical elements in Comparative Example 3 in which the same light-shielding paint as in Example 1 was used except that the curing agent A was added so that the equivalent ratio was as small as 0.05. The internal reflectance was 14%, which was a good result. As a result of the evaluation of the number of white spots after the light-shielding film was left to stand in a high-temperature and high-humidity environment, the number of white spots having a diameter of 0.02 mm or more in an image with a size of 6 mm² was 101 or more, which was a poor result. As a result of the solvent resistance test, IPA was colored, the film was detached, and the tinge of the film changed.

Table 11 shows the physical properties of the light-shielding film formed of the light-shielding paint for optical elements in Comparative Example 4 in which the same light-shielding paint as in Example 1 was used except that the curing agent A was added so that the equivalent ratio was as large as 0.55. The internal reflectance was 26%, which was a poor result. As a result of the evaluation of the number of white spots after the light-shielding film was left to stand in a high-temperature and high-humidity environment, the number of white spots having a diameter of 0.02 mm or more in an image with a size of 6 mm² was 101 or more, which was a poor result. As a result of the solvent resistance test, IPA was not colored.

Table 12 shows the physical properties of the light-shielding film formed of the light-shielding paint for optical elements in Comparative Example 5 in which the same light-shielding paint as in Example 5 was used except that the curing agent A was added so that the equivalent ratio was as large as 1.10. The internal reflectance was 32%, which was a poor result. As a result of the evaluation of the number of white spots after the light-shielding film was left to stand in a high-temperature and high-humidity environment, the number of white spots having a diameter of 0.02 mm or more in an image with a size of 6 mm² was 101 or more, which was a poor result. As a result of the solvent resistance test, IPA was not colored.

TABLE 9

| | | | | Light-shielding paint in Comparative Example 1 | Light-shielding paint in Comparative Example 2 |
|---|---|---|---|---|---|
| Light-shielding paint | Epoxy group-containing compound | Epoxy resin | Material | Epoxy resin A | Epoxy resin A |
| | | | Epoxy equivalent (g/eq) | 190 | 190 |
| | | | Amount added (g) | 21 | 21 |
| | | Coupling agent | Material | Epoxy-based silane coupling agent A | Epoxy-based silane coupling agent A |
| | | | Epoxy equivalent (g/eq) | 236 | 236 |
| | | | Amount added (g) | 1 | 1 |
| | Amine curing agent | | Material | Curing agent A | Curing agent A |
| | | | Active hydrogen equivalent (g/eq) | 80 | 80 |
| | | | Amount added (g) | 0.5 | 5.0 |
| | | | A'/A | 0.006 | 0.063 |
| | | | E'/E | 0.115 | 0.115 |
| | | Equivalent ratio (A'/A)/(E'/E) | | 0.05 | 0.55 |
| | Curing catalyst | | Material | 2,4,6-tris(diaminomethyl)phenol | 2,4,6-tris(diaminomethyl)phenol |
| | | | Amount added (g) | 0.5 | 0.5 |
| | Coloring agent | | Material | Dye | Dye |
| | | | Type | 1. Black dye<br>2. Red dye<br>3. Yellow dye<br>4. Blue dye | 1. Black dye<br>2. Red dye<br>3. Yellow dye<br>4. Blue dye |
| | | | Amount added | 1. 1.54<br>2. 3.82<br>3. 1.54<br>4. 6.13 | 1. 1.54<br>2. 3.82<br>3. 1.54<br>4. 6.14 |
| | | | Total amount added (g) | 13 | 13 |
| | Solvent | | Material | Propylene glycol monomethyl ether | Propylene glycol monomethyl ether |
| | | | Amount added (g) | 40 | 40 |
| | Inorganic fine particles | | Material | Titania (dispersed in propylene glycol monomethyl ether, solid content: 25 wt %) | Titania (dispersed in propylene glycol monomethyl ether, solid content: 25 wt %) |
| | | | Amount of solid content added (g) | 57.2 | 57.2 |
| Light-shielding film | | | Curing temperature | 40° C. | 40° C. |
| | | | Curing time | 8 hours | 8 hours |

| | | | | Light-shielding paint in Comparative Example 3 | Light-shielding paint in Comparative Example 4 |
|---|---|---|---|---|---|
| Light-shielding paint | Epoxy group-containing compound | Epoxy resin | Material | Epoxy resin A | Epoxy resin A |
| | | | Epoxy equivalent (g/eq) | 190 | 190 |
| | | | Amount added (g) | 10 | 10 |
| | | Coupling agent | Material | Epoxy-based silane coupling agent A | Epoxy-based silane coupling agent A |
| | | | Epoxy equivalent (g/eq) | 236 | 236 |
| | | | Amount added (g) | 12 | 12 |

TABLE 9-continued

| | | | | |
|---|---|---|---|---|
| | Amine curing agent | Material | Curing agent A | Curing agent A |
| | | Active hydrogen equivalent (g/eq) | 80 | 80 |
| | | Amount added (g) | 0.4 | 4.6 |
| | | A'/A | 0.005 | 0.058 |
| | | E'/E | 0.103 | 0.103 |
| | | Equivalent ratio (A'/A)/(E'/E) | 0.05 | 0.55 |
| | Curing catalyst | Material | 2,4,6-tris(diaminomethyl)phenol | 2,4,6-tris(diaminomethyl)phenol |
| | | Amount added (g) | 0.5 | 0.5 |
| | Coloring agent | Material | Dye | Dye |
| | | Type | 1. Black dye<br>2. Red dye<br>3. Yellow dye<br>4. Blue dye | 1. Black dye<br>2. Red dye<br>3. Yellow dye<br>4. Blue dye |
| | | Amount added | 1. 1.54<br>2. 3.82<br>3. 1.54<br>4. 6.15 | 1. 1.54<br>2. 3.82<br>3. 1.54<br>4. 6.16 |
| | | Total amount added (g) | 13 | 13 |
| | Solvent | Material | Propylene glycol monomethyl ether | Propylene glycol monomethyl ether |
| | | Amount added (g) | 40 | 40 |
| | Inorganic fine particles | Material | Titania (dispersed in propylene glycol monomethyl ether, solid content: 25 wt %) | Titania (dispersed in propylene glycol monomethyl ether, solid content: 25 wt %) |
| | | Amount of solid content added (g) | 57.2 | 57.2 |
| Light-shielding film | | Curing temperature | 40° C. | 40° C. |
| | | Curing time | 8 hours | 8 hours |

TABLE 10

| | | | | Light-shielding paint in Comparative Example 5 |
|---|---|---|---|---|
| Light-shielding paint | Epoxy group-containing compound | Epoxy resin | Material | Epoxy resin A |
| | | | Epoxy equivalent (g/eq) | 190 |
| | | | Amount added (g) | 21 |
| | | Coupling agent | Material | Epoxy-based silane coupling agent A |
| | | | Epoxy equivalent (g/eq) | 236 |
| | | | Amount added (g) | 1 |
| | Amine curing agent | | Material | Curing agent A |
| | | | Active hydrogen equivalent (g/eq) | 80 |
| | | | Amount added (g) | 10.1 |
| | | | A'/A | 0.126 |
| | | | E'/E | 0.115 |
| | | | Equivalent ratio (A'/A)/(E'/E) | 1.10 |
| | Curing catalyst | | Material | 2,4,6-tris(diaminomethyl)phenol |
| | | | Amount added (g) | 0.5 |
| | Coloring agent | | Material | Dye |
| | | | Type | 1. Black dye<br>2. Red dye<br>3. Yellow dye<br>4. Blue dye |
| | | | Amount added | 1. 1.54<br>2. 3.82<br>3. 1.54<br>4. 6.14 |
| | | | Total amount added (g) | 13 |
| | Solvent | | Material | Propylene glycol monomethyl ether |
| | | | Amount added (g) | 40 |
| | Inorganic fine particles | | Material | Titania (dispersed in propylene glycol monomethyl ether, solid content: 25 wt %) |
| | | | Amount of solid content added (g) | 57.2 |

TABLE 10-continued

|  |  | Light-shielding paint in Comparative Example 5 |
|---|---|---|
| Light-shielding film | Curing temperature<br>Curing time | 40° C.<br>8 hours |

TABLE 11

|  | Comparative Example 1 | Comparative Example 2 | Comparative Example 3 | Comparative Example 4 |
|---|---|---|---|---|
| Internal reflectance | 12 | 23 | 14 | 26 |
| Number of white spots after light-shielding film was left to stand in high-temperature and high-humidity environment (/mm²) | D | D | D | D |
| Solvent resistance | D | A | D | A |

TABLE 12

|  | Comparative Example 5 |
|---|---|
| Internal reflectance | 32 |
| Number of white spots after light-shielding film was left to stand in high-temperature and high-humidity environment (/mm²) | D |
| Solvent resistance | A |

The light-shielding film according to an embodiment of the present invention can be used as a light-shielding film for optical elements used in optical devices such as cameras, binoculars, microscopes, and semiconductor exposure devices. In the light-shielding film according to an embodiment of the present invention, the number of white spots, which are appearance defects, generated after the light-shielding film is left to stand in a high-temperature and high-humidity environment is small. Therefore, the light-shielding film can be used for optical elements such as lenses and prisms.

The present invention can provide a light-shielding paint that has good optical properties and suppresses the generation of white spots, which are generated at an interface between the glass and a light-shielding film and degrades the appearance, even when the light-shielding film is used in a high-temperature and high-humidity environment for a long time. The present invention can also provide a light-shielding paint set, a light-shielding film, an optical element, a method for producing a light-shielding film, and a method for producing an optical element.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An optical element comprising:
   a base made of an optical material; and
   a light-shielding film disposed on a portion of the base,
   wherein the light-shielding film comprises an epoxy group-containing compound, inorganic fine particles, a coloring agent and an amine curing agent,
   a content of the inorganic fine particles in the light-shielding film is 5.0 mass % or more and 40.0 mass % or less, and
   a ratio (A'/A) of a mass (A') of the amine curing agent to an active hydrogen equivalent (A) of the amine curing agent and a ratio (E'/E) of a mass (E') of the epoxy group-containing compound to an epoxy equivalent (E) of the epoxy group-containing compound satisfy formula (1) below $$0.1 \leq [(A'/A)/(E'/E)] \leq 0.45 \qquad \text{Formula (1)}.$$

2. The optical element according to claim 1, wherein the base is an optical lens or a prism.

3. An optical device comprising the optical element according to claim 1, wherein the optical device is a camera, binoculars, a microscope or a semiconductor exposure device.

4. The optical element according to claim 1, wherein the content of the inorganic fine particles in the light-shielding film is 15.0 mass % or less.

5. The optical element according to claim 1, wherein a content of the epoxy group-containing compound in the light-shielding film is 5.0 mass % or more and 60.0 mass % or less.

6. The optical element according to claim 5, wherein the content of the epoxy group-containing compound in the light-shielding film is 40.0 mass % or less.

7. The optical element according to claim 1, wherein a content of the amine curing agent in the light-shielding film is 1.0 mass % or more and 25.0 mass % or less.

8. The optical element according to claim 1, wherein a content of the coloring agent in the light shielding film is 5.0 mass % or more and 30.0 mass % or less.

9. The optical element according to claim 8, wherein the content of the coloring agent in the light shielding film is 15.0 mass % or less.

10. The optical element according to claim 1, wherein the light-shielding film comprises a curing catalyst, a tertiary amine or an imidazole compound.

11. A method for producing an optical element, the method comprising:
    applying, onto a peripheral surface of a base made of an optical material, a light-shielding paint comprising an epoxy group-containing compound, inorganic fine particles, a coloring agent, a curing catalyst, and an amine curing agent; and
    curing the applied light-shielding paint,
    wherein a ratio (A'/A) of a mass (A') of the amine curing agent to an active hydrogen equivalent (A) of the amine curing agent and a ratio (E'/E) of a mass (E') of the epoxy group-containing compound to an epoxy equivalent (E) of the epoxy group-containing compound satisfy formula (1) below $$0.1 \leq ((A'/A)/(E'/E)) \leq 0.45 \qquad \text{Formula (1)}.$$

12. The method according to claim 11,
wherein the curing of the applied light-shielding paint is performed in an atmosphere of 20° C. or more and 200° C. or less.

13. The method according to claim 11,
wherein the curing catalyst is a tertiary amine or an imidazole compound.

14. The method according to claim 11,
wherein the inorganic fine particles include particles of titanium oxide titanium oxide, zirconium oxide, aluminum oxide, yttrium oxide, cadmium oxide, diamond, strontium titanate, or germanium.

15. An optical element comprising:
a base made of an optical material; and;
a light-shielding film disposed on a portion of the base,
wherein the light-shielding film comprises an epoxy group-containing compound, inorganic fine particles, a coloring agent and an amine curing agent,
a content of the epoxy group-containing compound in the light-shielding film is 5.0 mass % or more and 60.0 mass % or less, and
a ratio (A'/A) of a mass (A') of the amine curing agent to an active hydrogen equivalent (A) of the amine curing agent and a ratio (E'/E) of a mass (E') of the epoxy group-containing compound to an epoxy equivalent (E) of the epoxy group-containing compound satisfy formula (1) below $$0.1 \leq [(A'/A)/(E'/E)] \leq 0.45 \quad \text{Formula (1).}$$

16. The optical element according to claim 15,
wherein the base is an optical lens or a prism.

17. An optical device comprising the optical element according to claim 15, wherein the optical device is a camera, binoculars, a microscope or a semiconductor exposure device.

18. The optical element according to claim 15,
wherein the content of the epoxy group-containing compound in the light-shielding film is 40.0 mass % or less.

19. The optical element according to claim 15,
wherein a content of the inorganic fine particles in the light-shielding film is 5.0 mass % or more and 40.0 mass % or less.

20. The optical element according to claim 15,
wherein a content of the amine curing agent in the light-shielding film is 1.0 mass % or more and 25.0 mass % or less.

21. The optical element according to claim 15,
wherein a content of the coloring agent in the light shielding film is 5.0 mass % or more and 30.0 mass % or less.

22. The optical element according to claim 21,
wherein the content of the coloring agent in the light shielding film is 15.0 mass % or less.

23. The optical element according to claim 15, wherein the light-shielding film comprises a curing catalyst, a tertiary amine or an imidazole compound.

* * * * *